March 30, 1965  T. W. ROGERSON  3,175,416
TORQUE LOCK RELEASE FOR CLUTCH MOTORS
Filed Oct. 22, 1962
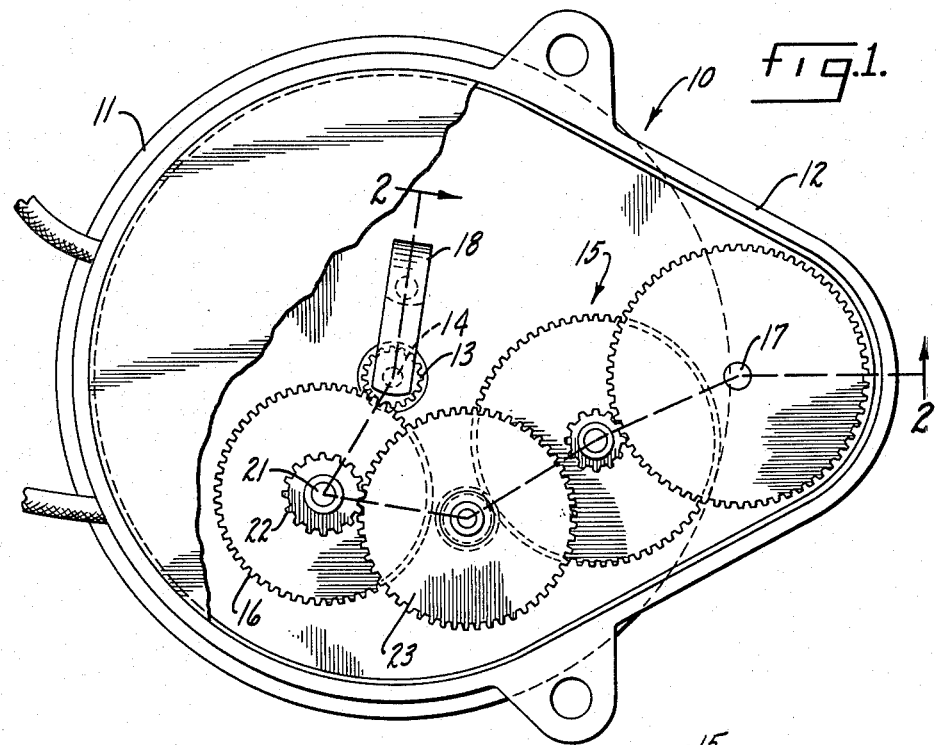
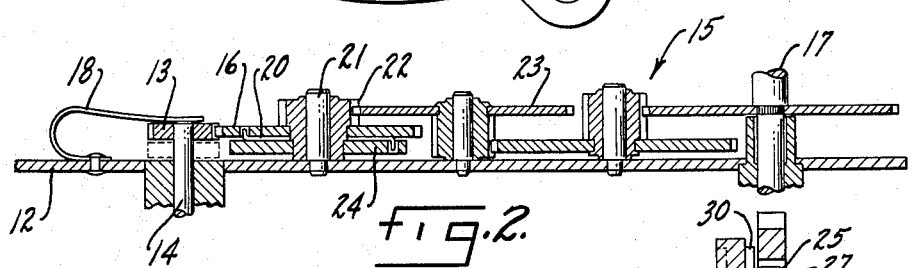
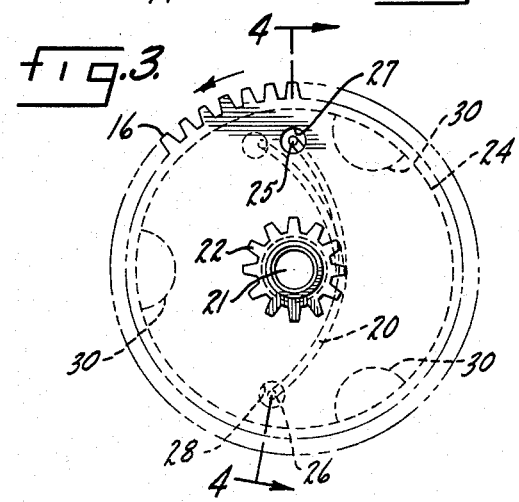
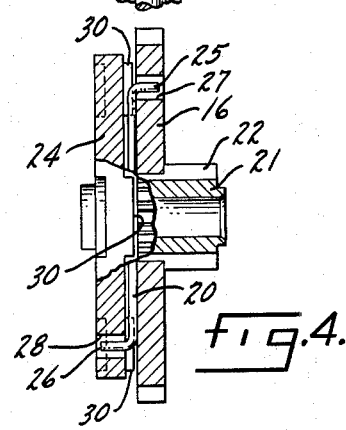
INVENTOR.
Thomas W. Rogerson,
BY
Attorney.

United States Patent Office 3,175,416
Patented Mar. 30, 1965

3,175,416
TORQUE LOCK RELEASE FOR CLUTCH MOTORS
Thomas W. Rogerson, Harwinton, Conn., assignor to General Time Corporation, New York, N.Y., a corporation of Delaware
Filed Oct. 22, 1962, Ser. No. 232,185
4 Claims. (Cl. 74—405)

This invention relates generally to timing motors and concerns, more particularly, a torque lock release for clutch motors of the synchronous timing type.

Synchronous timing motors often embody a clutching arrangement effective to disconnect the motor rotor from the driven gear train when the motor is deenergized and to reestablish the driving connection upon reenergization of the motor. A clutch motor of this type is disclosed in U.S. Patent No. 2,334,040, issued November 9, 1943 to Schellens.

It has been found that such clutch mechanisms often stick when the gear train is under load at the time the motor is deenergized. The torque in the driving train tends to frictionally hold the separable clutching gears in engagement.

Therefore, the primary aim of the invention is to provide a backoff or torque lock release mechanism for clutch motors of the above type.

It is also an object of the invention to provide a mechanism as characterized above which introduces very little looseness or lost motion into the driving train and which functions with complete reliability.

A further object is to provide a mechanism of the above described type which is sufficiently compact to be embodied in standard clutch motors without altering their design. Moreover, the mechanism embodies few parts, all of which may be manufactured using standard techniques and tolerances of the industry, so that the mechanism is inexpensive.

Other objects and advantages of the invention will become apparent upon reading the following detailed description and upon reference to the drawing, in which:

FIGURE 1 is an elevation of a synchronous timing motor embodying the invention with a portion of its case cut away to show the timing gear train;

FIG. 2 is a fragmentary section taken approximately along the bent line 2—2 in FIG. 1;

FIG. 3 is an enlarged elevation of a portion of the structure shown in FIG. 1; and FIG. 4 is a section taken approximately along the line 4—4 in Fig. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawing, there is shown in FIG. 1 a clutch motor 10 embodying the invention and including a winding and armature case 11 and a gear case 12 which together make up the frame of the motor. The case 11 contains elements defining a synchronous motor that delivers power, when energized, through a rotor pinion 13 that is secured to an armature shaft 14. A gear train 15 is mounted within the case 12 and includes a gear wheel 16 as the input element, and a shaft 17 as the output element of the gear train and of the motor 10.

The rotor pinion 13 is axially shiftable to and from an active position wherein the pinion is in mesh with the gear wheel 16 as shown in solid lines in FIG. 2. The inactive position of the pinion 13 is shown in dashed lines in FIG. 2 and, when so positioned, the pinion is disengaged from the gear wheel 16 so that the gear train 15 is disconnected from the motor. The armature shaft 14 is axially shiftable so as to carry the pinion 13 between active and inactive positions, with the pinion moving to its solid line, active position when the motor is energized. When the motor is deenergized, a spring 18 returns the armature shaft 14 and the pinion 13 to their inactive positions. It is believed that this mode of operation and the structure for accomplishing it will be well known to those familiar with this art and reference may be had to the Schellens patent identified for a complete discussion of this feature.

In accordance with the invention, the gear wheel 16 is mounted for free rotation relative to the gear train 15 and a spring 20 is provided coupling the gear wheel to the gear train so that torque is transmitted from the motor to the output shaft 17 through the spring 20, with the result that the spring is slightly stressed and thus able to deliver a reverse kick to the gear wheel 16 and the rotor pinion 13 upon interruption of the torque from the rotor pinion. Preferably, the gear wheel 16 is rotatably carried on a pinion shaft 21 that is journalled in the case 12 in parallel, spaced relation with respect to the rotor pinion 13. The pinion shaft 21 is formed with teeth 22 which mesh with a gear wheel 23 forming the next adjacent element of the gear train 15. A disk 24 is splined securely to the pinion shaft 21 adjacent the gear wheel 16 and the spring 20 is interposed between the disk 24 and the gear wheel 16. Preferably, the spring 20 takes the form of a short, arcuate length of spring wire disposed flatly between the disk and the gear wheel and having offset end portions 25 and 26 received in holes 27 and 28, respectively, formed in the gear wheel 16 and the disk 24. The opposite ends of the spring 20 are anchored to and thus couple the disk 24 and the relatively rotatable gear wheel 16.

In the preferred construction, the disk 24 is provided with peripheral portions 30 which engage and slidably support the gear wheel 16. In the illustrated form, the portions 30 are formed by three equally spaced upset, or half-blanked, semicircles positioned at the periphery of the disk 24.

In operation, energization of the motor within the motor case 11 causes the armature shaft 14, and thus the rotor pinion 13, to shift against the bias of the spring 18 so that the rotor pinion assumes its active position in mesh with the gear wheel 16. The motor torque rotates the gear wheel, which is freely mounted on the pinion shaft 21, in the direction of the arrow in FIG. 3 so as to slightly stress the spring 20 and thereafter pull the disk 24 along with the gear wheel 16. The stressed condition of the spring 20 is shown, with some exaggeration for clarity, in dashed lines in FIG. 3. Rotation of the disk 24 drives the pinion shaft 21 and, through the teeth 22, imparts power through the gear train 15 to the output shaft 17.

Upon deenergization or stalling of the motor, appreciable torque is no longer transmitted from the rotor pinion 13 to the gear wheel 16 and the spring 20 relaxes and exerts a slight reverse kick that tends to rotate the gear wheel 16 and the rotor pinion 13 in a direction opposite to the arrow in FIG. 3, thus relieving any frictional gripping which might exist between the teeth of the pinion 13 and the teeth of the gear wheel 16. The spring 18 can then easily return the pinion 13 to its inactive position so as to declutch the motor 10 from the gear train 15.

It will be seen that the torque lock releasing kick delivered by the spring 20 remains constant regardless of the gear ratio in the train 15 and virtually without regard to the load on the shaft 17. This, together with the very compact disposition of the gear wheel 16, disk 24 and spring 20, makes the invention quite versatile and adaptable.

Only a slight amount of lost motion is introduced into the gear train when utilizing the invention and the gear wheel 16 is well supported by the disk portions 30 so that there is little looseness or play. Those skilled in the art will appreciate that the disclosed structure can be readily and economically manufactured using standard techniques and tolerances.

I claim as my invention:

1. A clutch motor having an axially shiftable rotor pinion adapted to move into and out of engagement with a gear wheel that constitutes the input element of a gear train, characterized by said gear wheel mounted for free rotation relative to said gear train and means including a spring coupling said gear wheel to said gear train for transmitting torque from said rotor pinion to said gear train through said spring so that the spring is slightly stressed and thus able to deliver a reverse kick to said gear wheel and rotor pinion upon interruption of the torque from said rotor pinion.

2. A clutch motor comprising, in combination, a frame, a motor rotor pinion mounted on said frame for axial shifting movement to and from an active position, a pinion shaft rotatably mounted on said frame in parallel spaced relation with respect to the axis of said rotor pinion, pinion gear teeth on said shaft drivingly engaging a gear train on said frame, a gear wheel rotatably mounted on said shaft and positioned for meshing engagement with said rotor pinion when the latter is in said active position, and a spring coupling said gear wheel and said shaft so that torque is transmitted from said rotor pinion to said gear train through said spring with the result that the spring is slightly stressed and thus able to deliver a reverse kick to said gear wheel and rotor pinion upon interruption of the torque from said rotor pinion.

3. A clutch motor comprising, in combination, a frame, a motor rotor pinion mounted on said frame for axial shifting movement to and from an active position, a pinion shaft rotatably mounted on said frame in parallel spaced relation with respect to the axis of said rotor pinion, pinion gear teeth on said shaft drivingly engaging a gear train on said frame, a gear wheel rotatably mounted on said shaft and positioned for meshing engagement with said rotor pinion when the latter is in said active position, a disk fixed to said shaft adjacent said gear wheel and having peripheral portions engaging and slidably supporting the gear wheel, and a spring wire interposed between and coupling said gear wheel and said disk so that torque is transmitted from said rotor pinion to said gear train through said spring with the result that the spring is slightly stressed and thus able to deliver a reverse kick to said gear wheel and rotor pinion upon interruption of the torque from said rotor pinion.

4. A clutch motor comprising, in combination, a frame, a motor rotor pinion mounted on said frame for axial shifting movement to and from an active position, a pinion shaft rotatably mounted on said frame in parallel spaced relation with respect to the axis of said rotor pinion, pinion gear teeth on said shaft drivingly engaging a gear train on said frame, a gear wheel rotatably mounted on said shaft and positioned for meshing engagement with said rotor pinion when the latter is in said active position, a disk fixed to said shaft adjacent said gear wheel, and an arcuate length of spring wire interposed flatly between said gear wheel and said disk with end portions engaging and thus coupling said gear wheel and said disk so that torque is transmitted from said rotor pinion to said gear train through said spring with the result that the spring is slightly stressed and thus able to deliver a reverse kick to said gear wheel and rotor pinion upon interruption of the torque from said rotor pinion.

References Cited by the Examiner

UNITED STATES PATENTS

| 496,330 | 4/93 | Van Depoele. | |
|---|---|---|---|
| 2,334,040 | 11/43 | Schellens | 310—164 |
| 2,489,438 | 11/49 | Schrader. | |
| 3,013,413 | 12/61 | Luning. | |

FOREIGN PATENTS

| 274,094 | 5/14 | Germany. |
|---|---|---|
| 349,027 | 5/31 | Great Britain. |

DON A. WAITE, *Primary Examiner.*